United States Patent Office 3,012,865
Patented Dec. 12, 1961

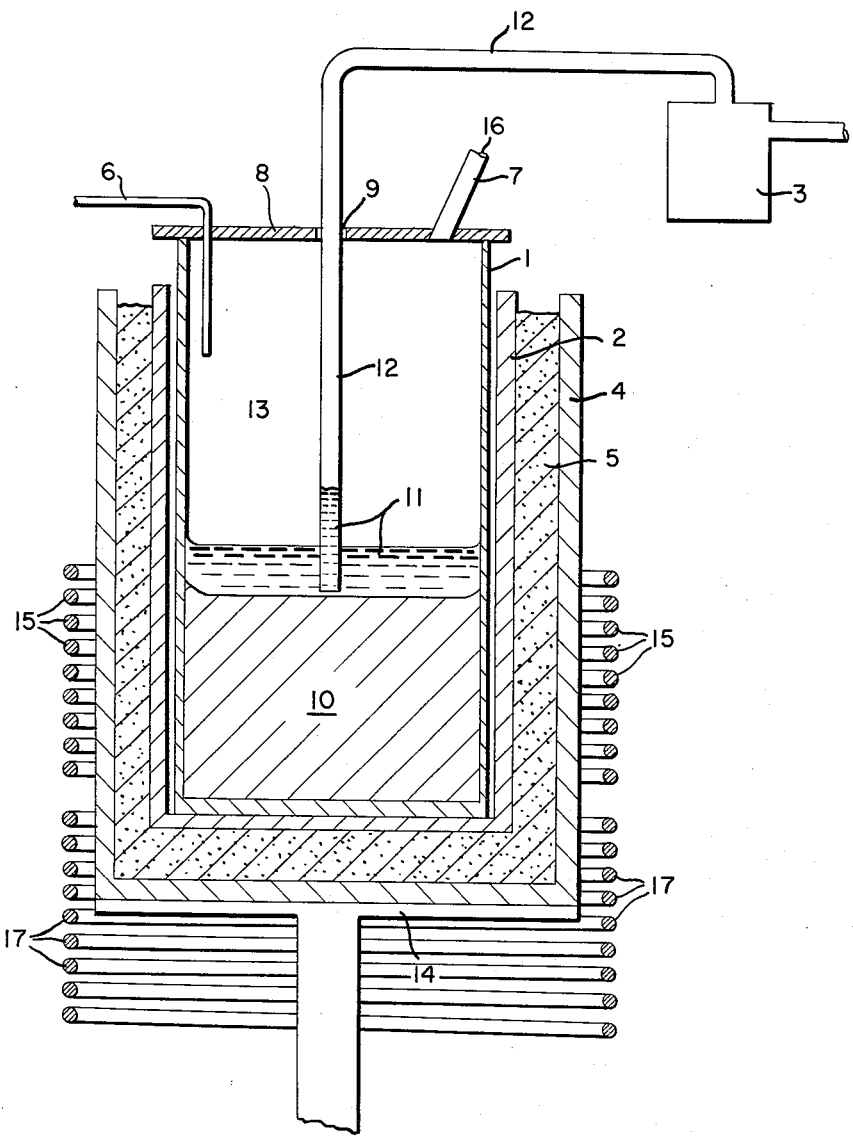

3,012,865
SILICON PURIFICATION PROCESS
Remo A. Pellin, Wilmington, Del., assignor to E. I. du Pont de Nemours and Company, Wilmington, Del., a corporation of Delaware
Filed Nov. 25, 1957, Ser. No. 698,649
4 Claims. (Cl. 23—308)

This invention relates to the purification and solidification of elemental silicon. More particularly, it relates to a process for purifying silicon of high purity to a higher and more useful degree of purity.

Processes for the preparation of elemental silicon by vapor phase reduction of silicon halides by zinc or hydrogen are well known and when carried out with very pure reagents produce very high purity elemental silicon having semiconductor properties. However, when making silicon semiconductor devices, it is normally necessary to melt the silicon to consolidate needle-form silicon obtained from the reduction process to form single crystals of the silicon. Sometimes it is necessary to further purify by zone refining. In many cases it is desirable to add doping agents. In carrying out this processing of high purity silicon it is necessary to perform the operations in a container constructed of material which will impart the least amount of impurities to the silicon. It has been found that silica equipment adds less unwanted impurities than other materials. Unfortunately, when the temperature of a silicon-silica interface is allowed to exceed the melting point of silicon by a few degrees, there is a tendency on the part of the silicon to adhere to the silica surface. Since the coefficient of expansion for solid silicon is much greater than for solid "fused" silica, a silica container having a wall thickness of greater than about .1 to .2 mm. will always be broken when a slowly solidifying mass of silicon is allowed to cool to room temperature.

Attempts to avoid this problem include the use of thin-wall (.1 to .2 mm.) silica containers which do not have a tendency to crack between meltings, and rigidly controlled temperature processes in which the temperature of the melt is held within one or two degrees above the melting point of silicon. In the first process, a silica container of such a small wall thickness will not support a melt greater than a few grams, which imposes a drastic limitation on the purification of large quantities of silicon requiring successive heating and cooling steps. In the second process, it is very difficult and costly to maintain such an extremely close temperature control and inherently requires very slow melting.

It is, therefore, an object of this invention to provide a novel process for the purification of silicon in which relatively large quantities may be produced in a single operation. It is another object of this invention to provide a process in which silicon in a silica container may be successively melted and remelted without breaking the container during successive melting and cooling steps.

The objects of this invention are accomplished by a process comprising charging a container of thick-wall silica of 3 mm. or greater in thickness with solid particles of high purity silicon. An inert gas, such as argon, is introduced into the unoccupied space within the container to avoid undesired contamination, and the charge is then heated in a furnace to melt the silicon. The application of heat to the molten charge is then adjusted by movement of either the heating element or the crucible to allow progressive solidification of the melt from the bottom upward; however, the temperature of the solidified portion is always maintained above 1100° C. The progressive solidification is stopped while a portion of the melt remains liquid. This liquid portion, containing the segregated impurities, is then removed from contact with the solid mass. The application of heat is then readjusted to remelt the solid mass, and the progressive solidification and removal of the liquid residue containing segregated impurities is repeated as many times as desired. Upon completion of the cyclic melting steps the solid mass is allowed to cool to room temperature, the inert atmosphere removed and the purified residual ingot is recovered.

A practical embodiment of the process of the invention may be described in reference to a convenient apparatus which can be utilized therein, and which is diagrammatically represented in the drawing. A thick-walled cylindrical silica container 1, is snugly fit within a graphite container 2 of the same shape. The graphite container 2 is positioned within another silica container 4 of cylindrical shape, but considerably larger in diameter. The space 5 between the graphite container 2 and the outer silica container 4 is filled with loose insulating material such as powdered silica or other insulating material that is also an electrical nonconductor. The inner silica container 1 has a wall thickness of one quarter inch or greater and has a fitted cover 8 which is not fused to the walls. The cover is equipped with a sight tube 7 closed with a clear quartz sight glass 16, an opening 9 in the center, and a silica tube 6 extending downward for introducing inert gas such as argon into the space 13 for shielding the melt from atmospheric contamination. The nest of silica and graphite containers 1, 2 and 4 is positioned on a supporting platform 14, which is moveable so that the containers can be lowered or raised to control the application of heat to the silicon charge. The silicon charge is heated by radiation from the graphite container 2 which is in turn heated by water-cooled copper high frequency induction heating coils 15 and 17.

In operating the purification process of the invention, the silica container 1 is filled with acicular, granular, or particulate silicon of relatively high purity. Such silicon nevertheless contains small amounts of undesired elements, as for example, aluminum or phosphorous, in amounts which may range from a few parts per million to a few parts per billion. Argon is flowed into the vapor space 13 of the container 1 to displace the air. The nest of cylinders is positioned for applying heat by means of the upper coil 15. The temperature of the silicon is raised slowly to melt down the silicon particles to form a molten pool, while the temperature of the melting silicon is controlled so that it is not heated to more than 50° C. above the melting point. The nest of cylinders containing the melt is then slowly lowered through the coil 15 and into the zone of application of heat from the induction coil 17 which is separately controlled to cause the melt to solidify and yet maintain its temperature as close to the melting point as possible. An ingot 10 is thus incrementally formed and the impurities with low distribution coefficients such as phosphorous, arsenic, aluminum, antimony, and the like, tend to remain in the liquid phase 11. When the molten portion 11 of the silicon mass is decreased to the extent that 5–25% of the original melt remains in the molten state, the molten residue is removed from contact with the frozen ingot. This is conveniently done by inserting the silica tube 12 through the opening 9 in the cover 8 down into the residual portion of the melt. Vacuum is applied to raise the molten silicon 11 containing the segregated impurities up into the silica tube. When all, or nearly all, of the silicon remaining in the molten state is removed from contact with the ingot 10, the silica tube is raised. The withdrawn silicon held in the tube is then allowed to solidify. Depending on the size of the operation and the relative size of the silica tube 12 used, compared to the size of the pool 11 of residual molten silicon, silicon sucked up into the withdrawal tube 12 can be carried over into a reservoir 3 outside of the purification apparatus for solidification and removal, or merely solidified in the tube 12, and removed with the tube.

By the above procedure the portion of the silicon containing the highest impurity content is segregated from the main part of the silicon batch and removed before it solidifies and becomes an intergral part of the ingot. Upon removal of the segregated unsolidified portion of the silicon from the system, the ingot may then be remelted by raising the containers so that the ingot is within the zone of application of heat from the upper coil 15. The process of lowering slowly and progressively solidifying the silicon to form an ingot while a small molten residue 11 of silicon containing the further segregated impurities remains molten, and separating the melt in the molten state from contact with the solidified portion of the batch, is repeated.

As many cycles as desired of melting and remelting may be carried out to obtain the degree of purity desired in the final product. Throughout the operation the temperature of the melt should be maintained within 50° C. of the melting point to avoid undue contamination from the silica container, and the temperature of the solidified part of the ingot should be maintained near the melting point, preferably above 1300° C. although down to 1100° C. is satisfactory. The maintenance of the temperature of the silicon within the crucible at all times above 1100° C. unexpectedly allows the successive melting and remelting necessary for repeated segregation cycles, without breakage of the silica equipment during the process.

The following examples are in illustration of the process of the invention but not in limitation thereof.

*Example 1*

Using an apparatus as illustrated in the drawing, 10,000 grams of silicon in the form of needles containing impurities as shown in the table below are melted at about 1430° C. in a cylindrical container 2¾" in diameter, 16" high, and ¼" in wall thickness. An argon purge is used to eliminate atmospheric contamination of the charge. The melting is carried out within the zone of heat application of the upper induction coil 15. The molten charge is progressively solidified by lowering the charge into the zone of heat application from the lower coil 17, at a rate of .5 cm. per minute, and while maintaining the temperature of the solidified portion of the ingot above 1300° C. When the silicon is lowered so that 24 cm. of the 30 cm. melt is solidified, the withdrawal tube 12 is inserted and the residual molten silicon is sucked up through the silica withdrawal tube to the cooled trap 3, making a 20/80 separation of the silicon in the molten state from that solidified. By raising the residual ingot back into the field of heat application of the upper induction coil 15, the ingot is remelted at about 1430° C. and then lowered to progressively solidify the melt. Upon 80% of the silicon being solidified, the residual molten portion is again removed. This same procedure is repeated a third time resulting in an ingot of 5100 grams. The purified product is much higher in resistivity and lifetime characteristics than the initial needles, tested in single crystal form. The change in impurity concentrations are shown in the table. Concentrations are expressed as atoms of impurity per billion atoms of silicon.

|  | Phosphorous and Arsenic | Boron | Aluminum |
| --- | --- | --- | --- |
| Initial atom Concentrations | 7 | 3.5 | 20. |
| Final atom Concentrations | 2 | 3 | not found. |

*Example II*

Sixteen pounds of silicon crystals of the same impurity content as that used in Example I are melted in a cylindrical container 4½" in diameter, 12½" high, and ¼" in wall thickness in an apparatus such as shown in the drawing. The melt is solidified gradually from the bottom up by lowering the silica container into the zone of heat application of the lower coil at a rate of 6 inches per hour, and while maintaining the ingot temperature above 1200° C. throughout the entire operation. A molten portion representing 8% by weight is withdrawn by means of the silica tube after 6 hours' operation. The melting and recrystallization process is then repeated. Analyses of the main portion of the silicon before and after the operation indicate the following concentration changes:

|  | Phosphorous and Arsenic | Boron | Aluminum |
| --- | --- | --- | --- |
| Initial atom Concentrations | 7 | 3.5 | 20. |
| Final atom Concentrations | 5 | 3.5 | less than 0.1. |

Analysis of the product for phosphorous indicates that final ingot has an average analysis of 5 parts per billion and the recovered product is equivalent to 84% of the original silicon. The temperature of the solidified silicon is maintained above 1200° C. throughout the process, until recovery of the product takes place.

The number of cyclic repetitions of the steps of the process, namely, desolidification, progressive resolidification, and separation of residual unsolidified melt containing the segregated impurities from the system, is dependent upon a number of factors. Thus, the higher the content of segregatable impurities in the initial silicon feed to the system, the more cycles that will be necessary. The higher the distribution coefficient (ratio of solute concentration in the just-freezing solid to that in the liquid) of the impurities that are being removed, the more cycles that will be required. The higher the efficiency of the method of separating the liquid phase from the residual solid phase during each cycle, the fewer cycles that will be necessary. While withdrawing the unsolidified phase by means of a tube inserted into the liquid is the preferred method of separation, due to its convenience and high efficiency, other methods such as tilting the entire apparatus and pouring off the liquid phase may be resorted to, if desired.

The type of heating utilized is not critical. While high frequency induction heating is particularly convenient, resistance heaters of the radiation type are successfully adaptable. The temperature of the melt, however, is maintained close to the melting point to minimize chemical reaction of the molten silicon with the silica walls. A further advantage of maintaining the melt at a low temperature is to avoid loss of strength of the silica container during the operation cycle. Preferably, the temperature of the melt is maintained at about 20° C. above the melting point, although operation up to about 50° C. above is practical.

The temperature of the solidified silicon is maintained as close to the melting point temperature as possible to eliminate breaking the silica vessel during the solidification operation, which allows for cyclic remelting. At no time after melting the first charge of silicon is the ingot allowed to become lower than 1100° C. in temperature until the final separation has been made, otherwise the silica container will break and the operation cannot be continued in the same vessel.

This invention has the distinct advantage of affording a means whereby large batches of silicon can be purified at one time, thus providing highly uniform batches of silicon in large quantity. It has the further advantage of providing an efficient and simplified method for purifying silicon without resort to the troublesome and costly "thin-wall" or close temperature control methods to avoid breakage of the silica container.

I claim as my invention:

1. A process for purifying elemental silicon in a single operation by repeated passage of said silicon through the solid and molten states under an inert gas atmosphere with intermittent withdrawal of impurities, characterized by placing a silicon charge to be purified in a thick-wall silica container having a wall thickness greater than about 0.2 mm., melting said silicon charge, progressively solidifying a portion thereof in a vertical direction to segregate impurities in the molten phase, removing the remaining molten phase containing the segregated impurities from contact with the solidified silicon, alternately remelting the remaining solidified silicon from each successive solidification, progressively solidifying a portion thereof in a vertical direction and withdrawing the remaining melt containing the segregated impurities, maintaining the temperature of said solidified silicon above 1100° C. throughout the entire operation until the final purified silicon product is produced, cooling said purified silicon, and recovering said purified silicon.

2. The process of claim 1 in which said molten phase is maintained within 50° C. of the melting point of silicon.

3. The process of claim 2 in which the temperature of said solidified silicon is maintained at about 1300° C. throughout the entire operation.

4. The process of claim 3 in which the molten phase withdrawn upon each solidification constitutes 5–25% of the melted or remelted silicon.

References Cited in the file of this patent

UNITED STATES PATENTS

| | | |
|---|---|---|
| 2,253,566 | Klepetko | Aug. 26, 1941 |
| 2,402,582 | Scaff | June 25, 1946 |
| 2,750,262 | Pfann | June 12, 1956 |

FOREIGN PATENTS

| | | |
|---|---|---|
| 762,982 | Great Britain | Dec. 5, 1956 |

OTHER REFERENCES

Keck et al.; The Review of Scientific Instruments, vol. 25, April 1954, pages 331–334.